(12) United States Patent
Tanoue et al.

(10) Patent No.: US 11,279,877 B2
(45) Date of Patent: *Mar. 22, 2022

(54) METHOD FOR IMPROVING SOIL

(71) Applicant: KAO CORPORATION, Tokyo (JP)

(72) Inventors: Akihiro Tanoue, Wakayama (JP); Yasuhiro Ishihara, Wakayama (JP)

(73) Assignee: KAO CORPORATION, Tokyo (JP)

(*) Notice: Subject to any disclaimer, the term of this patent is extended or adjusted under 35 U.S.C. 154(b) by 199 days.

This patent is subject to a terminal disclaimer.

(21) Appl. No.: 16/080,749

(22) PCT Filed: Mar. 10, 2017

(86) PCT No.: PCT/JP2017/009692
§ 371 (c)(1),
(2) Date: Aug. 29, 2018

(87) PCT Pub. No.: WO2017/179351
PCT Pub. Date: Oct. 19, 2017

(65) Prior Publication Data
US 2019/0023985 A1 Jan. 24, 2019

(30) Foreign Application Priority Data
Apr. 11, 2016 (JP) .............................. JP2016-079000

(51) Int. Cl.
*C09K 17/32* (2006.01)
*A01N 63/30* (2020.01)
*A01N 63/20* (2020.01)
*C05F 11/08* (2006.01)

(52) U.S. Cl.
CPC .............. *C09K 17/32* (2013.01); *A01N 63/20* (2020.01); *A01N 63/30* (2020.01); *C05F 11/08* (2013.01)

(58) Field of Classification Search
CPC .......... C05F 11/02; C05F 11/08; C09K 17/32; C05G 3/80; Y10S 71/903; A01C 23/047; A01N 63/20; A01N 63/30
See application file for complete search history.

(56) References Cited

U.S. PATENT DOCUMENTS

| 4,018,591 A * | 4/1977 | Buttarelli ................ C05F 11/00 71/23 |
| 5,391,542 A | 2/1995 | Browning |
| 5,922,646 A | 7/1999 | Schnabel et al. |
| 5,994,266 A | 11/1999 | Hobbs et al. |
| 2002/0039971 A1 | 4/2002 | Hayashi et al. |
| 2004/0084366 A1 | 5/2004 | Anderson et al. |
| 2013/0217868 A1 | 8/2013 | Fackler |
| 2015/0041083 A1* | 2/2015 | Yoshikawa ............ D21H 17/25 162/19 |
| 2019/0037842 A1 | 2/2019 | Ishihara et al. |

FOREIGN PATENT DOCUMENTS

| CN | 1330057 A | 1/2002 |
| CN | 1537830 A | 10/2004 |
| CN | 101497794 A | 8/2009 |
| CN | 102181506 A | 9/2011 |
| CN | 102612503 A | 7/2012 |
| CN | 103068888 A | 4/2013 |
| CN | 103183541 A | 7/2013 |
| CN | 103288553 A | 9/2013 |
| CN | 103998617 A | 8/2014 |
| CN | 104202962 A | 12/2014 |
| JP | 45-3171 B | 2/1970 |
| JP | 49-99844 A | 9/1974 |
| JP | 60-92219 A | 5/1985 |
| JP | 62-61564 B2 | 12/1987 |
| JP | 2-289481 A | 11/1990 |
| JP | 5-874 A | 1/1993 |
| JP | 5-117125 A | 5/1993 |
| JP | 6-65016 A | 3/1994 |
| JP | 8-12479 A | 1/1996 |
| JP | 8-259408 A | 10/1996 |
| JP | 9-154482 A | 6/1997 |
| JP | 9-509417 A | 9/1997 |
| JP | 9-512538 A | 12/1997 |
| JP | 10-273472 A | 10/1998 |
| JP | 11-292671 A | 10/1999 |
| JP | 11-513988 A | 11/1999 |
| JP | 11-514846 A | 12/1999 |
| JP | 2000-139221 A | 5/2000 |
| JP | 2000-264809 A | 9/2000 |
| JP | 2001-316207 A | 11/2001 |
| JP | 2004-224893 A | 8/2004 |
| JP | 2004-300419 A | 10/2004 |

(Continued)

OTHER PUBLICATIONS

R.E. Wildung, G. Chesters, D.E. Behmer, "Alkaline Nitrobenzene Oxidation of Plant Lignins and Soil Humic Colloids", 1970, Plant and Soil, vol. 32, p. 224-227 (Year: 1970).*

(Continued)

*Primary Examiner* — Jennifer A Smith
(74) *Attorney, Agent, or Firm* — Birch, Stewart, Kolasch & Birch, LLP

(57) ABSTRACT

The present invention is a method for improving soil, wherein a lignin decomposition product having an aldehyde yield by alkaline nitrobenzene oxidation of 5% by mass or more, a weight average molecular weight of 300 or more and 100,000 or less, and a contact angle with water is 15° or more is supplied to soil.

4 Claims, No Drawings

(56) References Cited

FOREIGN PATENT DOCUMENTS

| | | | |
|---|---|---|---|
| JP | 2006-504524 A | 2/2006 |
| JP | 2006-213900 A | 8/2006 |
| JP | 2012-17459 A | 1/2012 |
| JP | 2013-14737 A | 1/2013 |
| JP | 2013-505892 A | 2/2013 |
| JP | 2013-505964 A | 2/2013 |
| JP | 2013-241391 A | 12/2013 |
| JP | 2015-6997 A | 1/2015 |
| JP | 2015-6998 A | 1/2015 |
| JP | 2015-24365 A | 2/2015 |
| JP | 2015-509001 A | 3/2015 |
| JP | 2017-190331 A | 10/2017 |
| WO | WO 95/22253 A1 | 8/1995 |
| WO | WO 97/00614 A1 | 1/1997 |
| WO | WO 2011/038388 A2 | 3/2011 |
| WO | WO 2011/038389 A2 | 3/2011 |
| WO | WO 2013/094398 A1 | 6/2013 |
| WO | WO 2013/106724 A1 | 7/2013 |
| WO | WO 2015/015223 A1 | 2/2015 |

OTHER PUBLICATIONS

A. Tolbert, H. Akinosho, R. Khunsupat, "Review: Characterization and analysis of the molecular weight of lignin for biorefining studies", Biofuels, Bioproducts and Biorefining, Apr. 14, 2014, vol. 8 Issue 8, p. 1-21 (Year: 2014).*

Kock-Lee Law, "Definitions for Hydrophilicity, Hydrophobicity, and Superhydrophobicity: Getting the Basics Right", 2014, vol. 5, Issue 4, p. 686-688 (Year: 2014).*

Liukkonen, Annukka. "Contact angle of water on paper components: Sessile drops versus environmental scanning electron microscope measurements." Scanning 19.6 (1997): 411-415. (Year: 1997).*

Oudia, Atika, et al. "Pyrolysis-GC/MS and TG/MS study of mediated laccase biodelignification of Eucalyptus globulus kraft pulp." Journal of Analytical and Applied Pyrolysis 78.2 (2007): 233-242. (Year: 2007).*

Pinto, Paula CR, et al. "Kraft delignification of energy crops in view of pulp production and lignin valorization." Industrial Crops and Products 71 (2015): 153-162. (Year: 2015).*

International Preliminary Report on Patentability and English translation of the Written Opinion of the International Searching Authority (Forms PCT/IB/373 and PCT/ISA/237) For International Application No. PCT/JP2017/014790, dated Oct. 16, 2018.

International Preliminary Report on Patentability and English Translation of the Written Opinion of the International Searching Authority (Forms PCT/IB/373, and PCT/ISA/237) For International Application No. PCT/JP2017/009692, dated Oct. 16, 2018.

Lin et al., Eds, "Methods in Lignin Chemistry", Uni Publisher K. K., Jul. 10, 1994, Chapter 6.2.2, p. 220 to Chapter 6.2.2.7 on p. 226.

Yokoi, "The Technique for Improving Soil Physical Characteristics by Preventing the Formation of Soil Crust by Dressing the Sandy Pyroclastic Deposits", J. Jpn. Soc. Soil Phys., No. 103, 2006, p. 3-12, with English abstract.

"Method for Physicochemical Analysis of the Quality of Water Supply and Drainage," 1963, p. 280 (3 pages total).

"Soil Fertilizer Science," 1999, p. 21 (3 pages total).

"Soil Science," 1983, pp. 107-108 (4 pages total).

"Technical Handbook for High-Efficiency Fertilizers," 2013, p. 778 (3 pages total).

Chinese Office Action and Search Report for Chinese Application No. 201780014363.2, dated Jan. 20, 2020, with an English translation.

Sakai, "Rural and Agricultural Resource Recycling—Agricultural Practice of Waste Recycling," 2009, p. 89 (3 pages total).

Schnitzer, et al., "Human Substances in the Environment," Marcel Dekker, Inc., New York, 1972, p. 108 (3 pages total).

International Search Report (PCT/ISA/210) issued in PCT/JP2017/009692, dated Apr. 4, 2017.

Author Unknown, "Chemistry of plant fiber resource," 2012, pp. 150-151 (4 pages total).

Author Unknown, "Fruit Tree Physiology," 1992, 432-433 (4 pages total).

Chinese Office Action and Search Report for Chinese Application No. 201780014315.3, dated Apr. 29, 2020, with partial English translation.

"Pulping and Papermaking of Straw Fiber Raw Materials," Mar. 2013, pp. 198-201.

"Textbook Series for 21st Century," Soil Science, May 1, 2000, p. 83 (3 pages total).

Chinese Office Action and Search Report for Chinese Application No. 201780014363.2, dated Dec. 25, 2020, with English translation of the Office Action.

Japanese Office Action, dated Jan. 12, 2021, for Japanese Application No. 2017-078027 with English machine translation.

"200 Solutions to Agricultural Machinery Failure," 1980, p. 23 (3 pages).

"Geochemistry of Organic Uranium in the Turpan Depression and its Division of the Jurassic," 2006, p. 65 (3 pages).

"History of the Soil of the Xiang River," 1986, 2 pages.

"Innovations of the Soil Fertilizer in Liaoning and Practical Papers," 2007, pp. 304-306 (5 pages).

Chinese Office Action and Search Report for Chinese Application No. 201780014363.2, dated Aug. 13, 2020, with an English translation of the Office Action.

U.S. Appl. No. 16/080,917, filed Aug. 29, 2018.

International Search Report and Written Opinion of the International Searching Authority (forms PCT/ISA/210, PCT/ISA/237 and PCT/ISA/220), dated May 16, 2017 for International Application No. PCT/JP2017/014790, with an English translation of the International Search Report.

\* cited by examiner

METHOD FOR IMPROVING SOIL

FIELD OF THE INVENTION

The present invention relates to a soil improvement agent, a soil improvement agent composition, and a method for improving soil.

BACKGROUND OF THE INVENTION

In fields in which agricultural crops are cultivated, the properties of soil are an important factor from the viewpoint of productivity and the like. Various techniques for improving the properties of soil have conventionally been proposed. Some of them use plant materials.

JP-A 2012-17459 describes a method for producing a soil conditioning material in which lignocellulose biomass is subjected to saccharification treatment through predetermined steps.

JP-A 2006-213900 describes a pelletal soil improvement agent, using a plant material including 50% by weight or more of bark as a raw material, having a density of 0.8 to 3.0 g/cm$^3$, and absorbing water to expand the volume 2 to 100 times.

Japanese Patent Publication No. 45-3171 describes a method for producing a soil improvement agent for a suspension, wherein charcoal such as grass peat, peat and brown coal having a low degree of humification is immersed in an alkaline solution at a concentration of around 5% to around 10% and treated by adding an acid thereto, followed by neutralization.

Various solution techniques have been developed for the problem of a decrease in the germination rate due to the formation of soil crust. J. Jpn. Soc. Soil Phys., 2006, 103, 3-12 discloses that the formation of soil crust can be prevented by mixing sandy pyroclastic flow sediment into the soil on which the formation of soil crust is observed.

SUMMARY OF THE INVENTION

In fields, when soil is dried continuously after wetness, the phenomenon called soil crust, where the outer layer of the soil hardens, may occur. It is considered that the degree of aggregate structure, water in the soil, the particle size of the soil, the viscosity of the soil, and the like influence the formation of soil crust. The soil becomes hard as the dryness of the outer layer of the soil proceeds. As to crops such as soybeans the seeds of which are sown in the soil directly, the sprouting and the germination of seeds are markedly inhibited by soil crust.

The present invention provides a soil improvement agent, a soil improvement agent composition, and a method for improving soil that can improve properties of soil in fields, such as suppressing the formation of soil crust.

Solution to Problem

The present invention relates to a soil improvement agent, containing, as an effective component, a lignin decomposition product having an aldehyde yield by alkaline nitrobenzene oxidation of 5% by mass or more, a weight average molecular weight of 300 or more and 100,000 or less, and a contact angle with water of 15° or more.

The present invention relates to a soil improvement agent composition, containing a lignin decomposition product having an aldehyde yield by alkaline nitrobenzene oxidation of 5% by mass or more, a weight average molecular weight of 300 or more and 100,000 or less, and a contact angle with water of 15° or more.

The present invention relates to a method for improving soil, including supplying, to soil, a lignin decomposition product having an aldehyde yield by alkaline nitrobenzene oxidation of 5% by mass or more, a weight average molecular weight of 300 or more and 100,000 or less, and a contact angle with water of 15° or more.

According to the present invention, a soil improvement agent and a soil improvement agent composition that can improve properties of soil in fields, such as suppressing the formation of soil crust, are provided.

According to the present invention, a method for improving soil that can improve properties of soil in fields, such as suppressing the formation of soil crust, is provided.

EMBODIMENTS OF THE INVENTION

<Soil Improvement Agent>

The soil improvement agent of the present invention contains, as an effective component, a lignin decomposition product having an aldehyde yield by alkaline nitrobenzene oxidation of 5% by mass or more, a weight average molecular weight of 300 or more and 100,000 or less, and a contact angle with water of 15° or more (hereinafter sometimes referred to as a lignin decomposition product of the present invention). The present invention includes the soil improvement agent including the lignin decomposition product of the present invention.

The aldehyde yield of the lignin decomposition product of the present invention is 5% by mass or more. This aldehyde yield is preferably 9% by mass or more, more preferably 10% by mass or more, and further preferably 15% by mass or more, and preferably 50% by mass or less, more preferably 40% by mass or less, further preferably 30% by mass or less, and furthermore preferably 26% by mass or less from the viewpoint of suppressing the formation of soil crust by acting on soil components.

As to a method for alkaline nitrobenzene oxidation of the lignin decomposition product, an alkaline nitrobenzene oxidation method described in, for example, "Methods in lignin chemistry" (issued by Uni Publisher K. K., Jul. 10, 1994) can be referred to in the present invention.

The aldehyde yield measured specifically under the following conditions is adopted as the aldehyde yield of the lignin decomposition product in the present invention.

[Method for Measuring Aldehyde Yield of Lignin Decomposition Product]

A 20 ml vial is charged with 50 to 200 mg of a lignin decomposition product, which is a measuring object, 6 to 1.0 ml of a 2 M sodium hydroxide solution and 0.4 ml of nitrobenzene, and the mixture is heated at 170° C. for 2.5 hours with stirring at 900 rpm. The mixture is cooled after heating, followed by extracting 3 times with 5 to 15 ml of diethyl ether to remove a nitrobenzene reduction product and excessive nitrobenzene. Concentrated hydrochloric acid is added to the remaining aqueous layer, followed by adjusting the pH to 3 to 1 and further extracting 3 times with 5 to 15 ml of diethyl ether. This diethyl ether extract is distilled under a reduced. pressure to obtain an oxidization mixture. To this oxidization mixture is added 20 mL of dichloromethane. Then, 2 ml of the mixture is filtered through a Millipore HVHP membrane (manufactured by Nihon. Millipore K. K., 0.45 μm in pore size) and subjected to gas chromatography (GC).

A GC device (manufactured by Agilent Technologies Japan, Ltd.) equipped with an Agilent J&W GC column DB-5 (manufactured by Agilent Technologies Japan, Ltd.) is used for gas chromatography. The conditions of gas chromatography are as follows: a sample volume of 1.0 μL, a helium flow rate of 10 ml/min, an injection port temperature of 200° C., and a split ratio of 10:1. The temperature conditions are as follows: the temperature is maintained at 60° C. for 1 minute, then raised from 60 to 250° C. at 5° C./min and maintained at 250° C. for 10 minutes. With regard to quantification, calibration curves of peak area versus content are created using three aldehydes, which are vanillin, syringa aldehyde and para-hydroxybenzaldehyde, as reagents, respectively. The yields of the above-mentioned three aldehydes in the lignin decomposition product are determined separately. The aldehyde yield (%) is calculated by the following expression.

Aldehyde yield (%)=(aldehyde mass yield obtained by totaling amounts of three aldehydes/mass of lignin decomposition product)×100

The weight average molecular weight of the lignin decomposition product of the present invention is 300 or more and 100,000 or less. This weight average molecular weight is preferably 1,000 or more, more preferably 3,000 or more, further preferably 4,500 or more, and furthermore preferably 5,000 or more, and preferably 50,000 or less, more preferably 30,000 or less, further preferably 26,000 or less, and furthermore preferably 20,000 or less from the viewpoint of forming moderate soil particles and suppressing the formation of soil crust.

In the present invention, the weight average molecular weight of the lignin decomposition product is measured under the following conditions.

[Method for Measuring Weight Average Molecular Weight of Lignin Decomposition Product]

The weight average molecular weight of the lignin decomposition product is measured by the following operation under the following conditions by gel permeation chromatography (GPC).

[GPC Operation]

The measurement is performed by injecting 100 μL of a sample solution (1 mg/mL) containing a lignin decomposition product. The molecular weight of the sample is calculated based on a calibration curve prepared beforehand.

[GPC Conditions]

Model: HLC-8120GPC (Tosoh Corporation)
Detector: RI detector
Separation column: Two TSK-GEL α-M columns (Tosoh Corporation)
Guard column: TSKgel guard column α (Tosoh. Corporation)
Column temperature: 40° C.
Eluent: N,N-Dimethylibrmamide solution to which 60 mmol/L $H_3PO_4$ and 50 mmol/L LiBr are added
Flow rate of eluent: 1 mL/min
Standard sample: Monodisperse polystyrene mixed solution [A-500 (molecular weight $5.0 \times 10^2$), F-10 (molecular weight $9.64 \times 10^4$), and F-850 (molecular weight $8.42 \times 10^6$) produced by Tosoh Corporation; and products (molecular weight $4.0 \times 10^3$, $3.0 \times 10^4$, $9.29 \times 10^5$) produced by Pressure Chemical Company]

The contact angle with water (hereinafter called a water contact angle) of the lignin decomposition product of the present invention is 15° or more. This water contact angle is preferably 17.5° or ore, more preferably 20° or more, and further preferably 26° or more, and preferably 100° or less, more preferably 80° or less, further preferably 60° or less, and furthermore preferably 40° or less from the viewpoint of maintaining the adhesion or the adsorption between soil and the lignin decomposition product.

In the present invention, the water contact angle of the lignin decomposition product is measured under the following conditions.

[Method for Measuring a Water Contact Angle of Lignin Decomposition Product]

When a lignin decomposition product, which is a measuring object, is obtained as a powder, 0.1 to 0.3 g of the lignin decomposition product is collected and compressed into a compressed article having planes, for example, a compressed article having a shape such as a cylinder, a cube or a cuboid so that the density is 1.3 to 1.7 $g/cm^3$. The compressed article is used as a sample. When the particles of the lignin decomposition product, which is a measuring object, are large or irregular in shape, and the like, the lignin decomposition product is pulverized into powder having a particle size and a shape adjusted. This powder may be compressed into a compressed article and used as a sample in the same way as the above. The powder of the lignin decomposition product may be pulverized into fine particles by compression.

A sample, for example, a compressed article of the lignin decomposition product, is placed so that a plane is horizontal, pure water at 20° C. is dropped at a particle size of 5 μm onto the above-mentioned plane, and the contact angle after 1 second is measured. A contact angle is determined by determining angles formed by the two lines connecting the apex with the right and left endpoints of the liquid drop, respectively and the surface of the solid, and doubling one of these angles (θ/2 method). Every sample is measured 3 times, and a value obtained as the average thereof is adopted as a water contact angle.

The lignin decomposition product of the present invention is obtained by decomposing natural lignin obtained from plant biomass.

The main bonds of natural lignin are β-O-4 bonds, and form macromolecules. The decomposition of the β-O-4 bonds and various condensation reactions of lignin proceed in the process in which lignin is extracted from plant biomass, resulting in change in the constitution of bonds in lignin. Alkaline nitrobenzene oxidation is a technique for decomposing β-O-4 bonds in lignin and quantifying the amount of the β-O-4 bonds from generated aldehyde monomers. That is, aldehyde yield by alkaline nitrobenzene oxidation indicates the degree of lignin modification, and indicates that the degree of modification becomes lower as its value becomes higher. As lignin becomes less modified, the contents of aliphatic OH groups and phenolic OH groups become higher, and the reactivity becomes higher. It is expected that action such as adherability to and adsorbability in soil will, increase by using less modified lignin in the present invention.

It is assumed that fine particles in soil are grown to have a moderate particle size and aggregated by using a lignin decomposition product having a predetermined molecular weight, and therefore the formation of soil crust can be suppressed due to decrease in the denseness of soil in the present invention.

In addition, it becomes difficult for the lignin decomposition product of the present invention having a predetermined water contact angle to dissolve in water, resulting in improvement in rain resistance. Consequently, the aggregate structure is maintained over a long period of time, and the effect of suppression of soil mist formation can be maintained for a longer period of time.

The lignin decomposition product of the present invention can be produced, for example, by the below-mentioned method for producing a soil improvement agent of the present invention.

Although the form of the soil improvement agent of the present invention may be either of solid and liquid, solid is preferable. Powder is preferable among solids. The average particle size of the powder may be 0.1 μm or more and 10 mm or less. It is preferable that the lignin decomposition product of the present invention is powder, and further preferable that it is a powder having the above-mentioned average particle size.

The soil improvement agent of the present invention can be used for uses such as a soil anticaking agent, a soil-aggregating agent, a soil softener, a soil treatment agent, a soil hardness regulator, and a soil crust formation inhibitor.

The soil improvement agent of the present invention can be used in fields in which various crops are cultivated. The soil improvement agent of the present invention is useful for fields in which, for example, vegetables (fruit vegetables, leaf vegetables, and root vegetables), fruit trees, and grain are cultivated, and useful. especially for fields of grain. Further among grain, the soil improvement agent is useful for fields for soybeans. The soil improvement agent is useful especially for fields for soybeans that are changed from paddy fields.

Soybeans abundantly contain useful components such as lipids, amino acids, proteins and isoflavone. Soybeans have been used not only for directly edible uses such as boiled beans, but also used frequently for food for processing in Japan. Internal components of soybeans have been used for raw materials of cosmetics recently. Thus, soybeans are an important crop.

Meanwhile, when soybeans are sown in fields changed from paddy fields, the low sprouting rate thereof may be a problem. This results from the physical properties of paddy soil. When paddy soil is dried after rain fall, the paddy soil forms hard soil crust (crust forming). Consequently, even if soybeans sprout after the soybeans are sown, the buds thereof may not germinate on the ground without being able to break soil crust. Even if the soybeans can germinate, problems may occur as to subsequent grow ability.

Use of the lignin decomposition product of the present invention can efficiently suppress the formation of hard soil crust on fields changed from paddy fields, and can increase the germination rate of crops such as soybeans. Therefore, the yields of crops such as soybeans can be improved by using the lignin decomposition product of the present invention.

<Soil Improvement Agent Composition>

A soil improvement agent composition of the present invention contains a lignin decomposition product having an aldehyde yield by alkaline nitrobenzene oxidation of 5% by mass or more, a weight average molecular weight of 300 or more and 100,000 or less, and a contact angle with water of 15° or more (hereinafter sometimes referred to as a lignin decomposition product of the present invention). Specific examples and preferable aspects of the lignin decomposition product of the present invention are the same as those shown for the soil improvement agent of the present invention.

The soil improvement agent composition of the present invention contains the lignin decomposition product of the present invention in an amount of preferably 25% by mass or more, more preferably 40% by mass or more, and further preferably 60% by mass or more, and preferably 100% by mass or less, more preferably 90% by mass or less, and further preferably 80% by mass or less from the viewpoint of forming soil into aggregate structure efficiently and suppressing the formation of soil crust.

The soil improvement agent composition of the present invention can contain components other than the lignin decomposition product of the present invention.

For example,
(1) a fertilizer component;
(2) a mineral powder, a clay component, or another soil-improving component such as zeolite, vermiculite, bentonite, soft silica (silicate terra alba), perlite, peat moss, or bark compost;
(3) a polymer substance such as polyethyleneimine, polyvinyl alcohol, or polyacrylic acid;
(4) a signal molecule such as chitooligosaccharide, a chitinous compound, or flavonoid such as isoflavone or rutin;
(5) a fungus such as an arbuscular mycorrhizal fungus;
(6) a bacterium such as *Bacillus* sp., *Pseudomonas* sp., *Azospirillum* sp., *Paenibacillus* sp., *Burkholderia* sp., *Serratia* sp., *Enterobacter* sp., *Brevibacterium* sp., *Curtobacterium* sp., or a legume symbiotic root nodule bacterium; and the like can be contained.

Among, the above-mentioned components, examples of an arbuscular mycorrhizal fungus of (5) include fungi belonging to the *Gigaspora* genus and the *Glomus* genus. Among these, examples of *Glomus* sp. include *Glomus intraradices*.

Among the above-mentioned components, examples of *Bacillus* sp. of (6) include *Bacillus amyloliquefaciens*, *Bacillus lichenifomns*, *Bacillus subtilis*, and *Bacillus thuringiensis*. Examples of *Pseudomonas* sp. include *Pseudomonas putida*, and *Pseudomonas fluorescens*. Examples of *Azospirillum* sp. include *Azospirillum brasilense*, *Azospirillum lipoferum*, *Azospirillum halopraeferans*, and *Azospirillum amazonense*. Examples of *Paenibacillus* sp. include *Paenibacillus polymyxa* and *Paenibacillus macerans*. Examples of *Burkholderia* sp. include *Burkholderia gladioli*. Examples of *Serratia* sp. include *Serratia marcescens*. Examples of *Enterobacter* sp. include *Enterobacter cloacae*. Example of *Brevibacterium* sp. include *Brevibacterium iodinum* and *Brevibacterium brevis*. Example of *Curtobacterium* sp. include *Curtobacterium flaccumfaciens*. Examples of the legume symbiotic root nodule bacterium include bacteria belonging to the *Rhizobium* genus, the *Bradyrhizobium* genus, and *Azorhizobium* genus. Examples of *Bradyrhizobium* sp. include *Bradyrhizobium diazoefficiens*, *Bradyrhizobium japonicum*, *Bradyrhizobium elkanii*, and *Ensifer fredii*.

The soil improvement agent composition of the present invention can contain 1% by mass or more and 50% by mass or less of (1) a fertilizer component.

The soil improvement agent composition of the present invention can contain 1% by mass or more and 50% by mass or less of (2) a mineral powder, a clay component, or another soil-improving component; or (3) a polymer substance respectively.

The soil improvement agent composition of the present invention can contain. $2.5 \times 10^{-13}$% by mass or more and $2.5 \times 10^{-11}$% by mass or less of (4) a signal molecule.

The soil improvement agent composition of the present invention can contain $10^2$ cfu (colony forming unit) or more and $10^7$ cfu or less of (5) a fungus and/or (6) a bacterium per 1 g of the lignin decomposition product respectively. Here, in the case of a fungus, the colony forming unit means the number of spores.

It is expected that the activity and the amount of plant adhesion of useful microorganisms, for example, plant growth-promoting bacteria such as an arbuscular mycorrhizal fungus, Bacillus sp., Pseudomonas sp., Azospirillum sp., Paenibacillus sp., Burkholderia sp., Serratia sp., Enterobacter sp., Brevibacterium sp., and Curtobacterium sp.; and legume symbiotic root nodule bacteria, that exist in the soil will be able to be improved by adding the soil improvement agent composition of the present invention to soil. It is expected similarly that the activity and the amount of plant adhesion of plant growth-promoting bacteria such as an arbuscular mycorrhizal fungus, Bacillus sp., Pseudomonas sp., Azospirillum sp., Paenibacillus sp., Burkholderia sp., Serratia sp., Enterobacter sp., Brevibacterium sp., and Curtobacterium sp.; or legume symbiotic root nodule bacteria that the soil improvement agent composition of the present invention contains will be able to be improved.

It is considered that the form of the soil improvement agent composition of the present invention is powdery or liquid, and the liquid one is preferable.

The soil improvement agent composition of the present invention can be used for uses such as a soil anticaking agent composition, a soil-aggregating agent composition, a soil softener composition, a soil treatment agent composition, a soil. hardness regulator composition, and a soil crust formation inhibitor composition.

Soil improved by the soil improvement agent or the soil improvement agent composition of the present invention may be any soil, but examples of the soil preferably include Inceptisols, Entisols, Vertisols, Alfisols, and Ultisols according to an American method for classifying soils, "Soil Taxonomy" (1974). The soil is preferably soil belonging to Inceptisols, Entisols, Vertisols, or Alfisols, and further preferably soil belonging to Inceptisols, Entisols, or Vertisols.

<Method for Improving Soil>

In the method for improving soil of the present invention, a lignin decomposition product having an aldehyde yield by alkaline nitrobenzene oxidation of 5% by mass or more, a weight average molecular weight of 300 or more and 100,000 or less, and a contact angle with water of 15° or more (hereinafter sometimes referred to as a lignin decomposition product of the present invention hereinafter) is supplied to soil. Specific examples and preferable aspects of the lignin decomposition product of the present invention used for the method for improving soil of the present invention are the same as those shown for the soil improvement agent of the present invention.

It is preferable to use the soil improvement agent or the soil improvement agent composition of the present invention in the method for improving soil of the present invention.

In the present invention, the lignin decomposition product of the present invention can be supplied to soil by methods such as mixing the lignin decomposition product into soil or spraying the lignin decomposition product in soil. In the present invention, soil and the lignin decomposition product of the present invention are brought into contact.

It is preferable to mix the solid lignin decomposition product of the present invention with soil or to mix a liquid substance obtained by mixing the solid lignin decomposition product of the present invention and a solvent such as water with soil in the present invention. Powder is preferable when the lignin decomposition product of the present invention is used in the form of solid.

Specific examples of the method for mixing the lignin decomposition product of the present invention with soil in fields include a method for cultivating while spraying the lignin decomposition product of the present invention, the soil improvement agent of the present invention or the soil improvement agent composition of the present invention using a spraying machine together with, a cultivator or the like.

In the method for improving soil of the present invention, the lignin decomposition product of the present invention is supplied in an amount of preferably 0.0001 parts by mass or more, more preferably 0.01 parts by mass or more, and further preferably 0.05 parts by mass or more, and preferably 10 parts by mass or less, more preferably 5 parts by mass or less, and further preferably 2.5 parts by mass or less per 100 parts by mass of soil from the viewpoint of forming soil into aggregate structure efficiently and suppressing the formation of soil crust. When the lignin decomposition product of the present invention is mixed, it is preferably mixed in this amount.

When the lignin decomposition product of the present invention is supplied to soil by spraying in the method for improving soil of the present invention, the above-mentioned lignin decomposition product is sprayed in an amount of preferably 0.2 kg or more, more preferably 2 kg or more, and further preferably 20 kg or more, and preferably 20000 kg, more preferably 5000 kg or less, and further preferably 2000 kg or less per 10 ares of soil from the viewpoint of forming soil into aggregate structure efficiently and suppressing the formation of soil crust. Also when the lignin decomposition product of the present invention is sprayed, the amount of the lignin decomposition product supplied per 100 parts by mass of soil may be in the above-mentioned range.

<Method for Producing Soil Improvement Agent>

The lignin decomposition product of the present invention can be obtained by the decomposition of plant biomass.

Examples of a method for producing a soil improvement agent containing the lignin decomposition product of the present invention include a method for producing a soil improvement agent, that has the following step 1 and step 2.

Step 1: mixing plant biomass, 8 parts by mass or more and 70 parts by mass or less of a basic compound relative to 100 parts by mass of the solid content of the plant biomass, and 10 parts by mass or more and 10,000 parts by mass or less of water relative to 100 parts by mass of the solid content of the plant biomass; and treating the mixture under the condition that the H-factor is 25,000 or less to obtain a reaction product.

Step 2: extracting, from the reaction product obtained in step 1, a lignin decomposition product wherein the aldehyde yield by alkaline nitrobenzene oxidation is 5% by mass or more, the weight average molecular weight is 300 or more and 100,000 or less, and the contact angle with water is 15° or more.

According to the present invention, there is provided a method for producing a soil improvement agent, which can efficiently produce a lignin decomposition product of the present invention that can be used as a soil improvement agent that can improve properties of soil in fields such as suppressing the formation of soil crust.

Step 1 is a step of heat-treating plant biomass with 8 parts by mass or more and 70 parts by mass or less of a basic compound and 10 parts by mass or more and 10,000 parts by mass or less of water relative to 100 parts by mass of the solid content of the plant biomass with the H-factor in the range of 25,000 or less.

Plant biomass is used in step 1.

Examples of the plant biomass include herbaceous biomass and ligneous biomass. Among these, herbaceous biomass is preferable.

The herbaceous biomass means plant materials other than trees inhabiting grassland, or non-ligneous plant parts. Specific examples include plant materials of Gramineae, Malvaceae and Leguminosae, and non-ligneous materials of Palmae.

Examples of the plant materials of Gramineae include bagasse such as sugarcane bagasse and sorghum bagasse, switchgrass, elephant grass, corn stover, corncob, rice straw, wheat straw, barley, Japanese pampas grass, grass, Johnson grass, Erianthus, and napier grass. Examples of the plant materials of Malvaceae include kenaf and cotton plant. Examples of the plant materials of Leguminosae include alfalfa. Examples of the non-ligneous materials of Palmae include empty fruit bunches of oil palm.

Among these, the plant materials of Gramineae are preferable, sugarcane bagasse, corncob and rice straw are more preferable, and sugarcane bagasse is further preferable from a viewpoint of productivity and handleability.

Examples of the ligneous biomass include various wood such as wood chips obtained from conifer such as Japanese larch and swamp cypress, and broadleaf trees such as oil palm and Japanese cypress; and wood pulp produced from these woods.

These types of plant biomass may be used alone or in combination of two or more.

Although the plant biomass can also be used without pulverization treatment, the plant biomass is preferably subjected to pulverization treatment from the viewpoint of efficiency in treatment.

Examples of a pulverizer to use include, but are not particularly limited to, roll mills such as a high pressure compression roll mill and a roll rotation mill; vertical roller mills such as a ring roller mill, a roller race mill and a ball race mill; vessel driving medium mills such as a rolling ball mill, a vibration ball mill, a vibration rod mill, a vibration tube mill, a planetary ball mill and a centrifugal fluidization mill; medium stirring mills such as a tower mill, a stirring tank mill, a circulation tank mill and an annular mill; consolidation shear mills such as high speed centrifugal roller mill and an angmill; a mortar; a stone mill; a mass-colloider; a fret mill; an edge runner mill; a knife mill; a pin mill; and a cutter mill.

Among these, a vessel driving medium mill or a medium stirring mill is preferable, a vessel driving medium mill is more preferable, a vibration mill such as a vibration ball mill, a vibration rod mill or a vibration tube mill is further preferable, and a vibration rod mill is further preferable from the viewpoint of efficiency in the pulverization of plant biomass and productivity.

The pulverization method may be either of a batch type and a continuation type.

Examples of the material of a device to use for pulverization and/or a medium include, but are not particularly limited to, iron, stainless steel, alumina, zirconia, silicon carbide, silicon nitride and glass. However, iron, stainless steel, zirconia, silicon carbide and silicon nitride are preferable from the viewpoint of efficiency in the pulverization of cellulose-containing raw materials, and iron or stainless steel is more preferable from the viewpoint of industrial use.

It is preferable that the device to use is a vibration mill and media are rods or halls from the viewpoint of efficiency in the pulverization of the plant biomass.

When the media are rods, the outer diameter of the rods is preferably 5 mm or more, more preferably 10 mm or more, and further preferably 20 mm or more from the viewpoint of efficient pulverization, and preferably 100 mm or less, more preferably 50 man or less, and further preferable 40 mm or less from the same viewpoint.

When the media are balls, the outer diameter of the balls is preferably 0.1 am or more and more preferably 1 mm or more from the viewpoint of efficient pulverization, and preferably 100 mm or less and more preferably 50 mm or less from the same viewpoint.

Although the filling factor of media differs in the suitable range from one model of a vibration mill to another, the filling factor is preferably 10% by volume or more, more preferably more preferably 30% by volume or more, and further preferably 50% by volume or more, and preferably 95% by volume or less, 90% by volume or less, and further preferably 70% by volume or less from the viewpoint of efficient pulverization. Herein, the filling factor means the volume of media relative to the volume of a vessel in the stirring part of a vibration mill.

Although the time of pulverization varies depending on the pulverizer to use, the amount of energy to use and the like, the time of pulverization is usually 1 minute or more, and preferably 3 minutes or more from the viewpoint of micronization of plant biomass, and usually 12 hours or less, preferably 3 hours or less, more preferably 1 hour or less, and further preferably 12 minutes or less from the viewpoint of the micronization of plant biomass and economic efficiency.

It is preferable to subject plant biomass to pulverization treatment in the presence of a basic compound from the viewpoint of improvement in efficiency in the pulverization of the plant biomass, improvement in the saccharification rate, and improvement in production efficiency (the shortening of production time). The biomass is neutralized by acid preferably after the treatment.

Examples of the basic compound used for pulverization treatment include alkali metal hydroxides such as sodium hydroxide, potassium hydroxide and lithium hydroxide; alkaline earth metals hydroxides such as magnesium hydroxide and calcium hydroxide; alkali metal oxides such as sodium oxide and potassium oxide; alkaline earth metals oxides such as magnesium oxide and calcium oxide; alkaline metal sulfides such as sodium sulfide and potassium sulfide; alkaline earth metals sulfides such as magnesium sulfide and calcium sulfide; quaternary ammonium hydroxides such as tetramethylammonium hydroxide and tetrabutylammonium hydroxide. Among these, the basic compound is preferably an alkali metal hydroxide or an alkaline earth metal hydroxide, more preferably an alkali metal hydroxide, and further preferably sodium hydroxide or potassium hydroxide from the viewpoint of improvement in the enzyme saccharification rate. These basic compounds can be used alone or in combination of two or more.

When all the holocellulose in plant biomass is assumed to be cellulose, the amount of the basic compound used in pulverization treatment is preferably 0.01-fold mol or more, more preferably 0.05-fold mol or more, and further preferably 0.1-fold mol or more, and preferably 10-fold mol or less, more preferably 8-fold mol or less, further preferably 5-fold mol or less, further preferably 1.5-fold mol or less per 1 mol of anhydroglucose units (they may be called "AGU" hereinafter) that constitute the cellulose from the viewpoint of the ease of neutralization and/or washing of the basic compound and the viewpoint of the cost of the basic compound.

The amount of water at the time of pulverization treatment is preferably 0.1% by mass or more, more preferably 0.5% by mass or more, further preferably 1% by mass or more, further preferably 2% by mass or more, and preferably 40% by mass or less, more preferably 30% by mass or less, further preferably 20% by mass or less relative to the dry mass of plant biomass.

The amount of water at the time of pulverization treatment means the amount of water relative to the dry mass of plant biomass, and can be adjusted properly by reducing the amount of water contained in plant biomass and the basic compound by the drying treatment or the like; or increasing the amount of water by adding water at the time of pulverization treatment, or the like.

The average particle size of plant biomass obtained after pulverization treatment is preferably 1 μm or more, and more preferably 5 μm or more, and preferably 150 μm or less, and more preferably 100 μm or less from the viewpoint of improvement in the yield of lignin and improvement in efficiency in saccharitication. The average particle size of the plant biomass is measured using a laser diffraction/scatter particle size distribution measuring device "LA-950" (manufactured by HORIBA, Ltd.).

The crystallinity degree of the cellulose type I of the plant biomass obtained after pulverization treatment is preferably 0% or more, and preferably 40% or less, more preferably 30% or less, further preferably 20% or less, further preferably 15% or less from the viewpoint of improvement in the yield of lignin and improvement in efficiency in saccharification. The crystallinity degree of the cellulose type I of the plant biomass is calculated from a diffraction intensity value by X-ray diffraction by the Segal method and defined by the following Expression (1).

$$\text{Crystallinity degree of cellulose type 1 (\%)} = [(I_{22.6} - I_{18.5})/I_{22.6}] \times 100 \quad (1)$$

[where $I_{22.6}$ indicates the diffraction intensity of a lattice plane (002 plane) (diffraction angle 2 θ=22.6°) in X-ray diffraction, and $I_{18.5}$ indicates the diffraction intensity of amorphous parts (diffraction angle 2 θ=18.5°).]

A basic compound (hereinafter also called "alkali") is used in step 1. Examples of the basic compound include alkali metal hydroxides such as sodium hydroxide, a potassium hydroxide and lithium hydroxide; alkaline earth metal hydroxides such as magnesium hydroxide and calcium hydroxide; alkali metal oxides such as sodium oxide and potassium oxide; alkaline earth metal oxides such as magnesium oxide and calcium oxide; alkaline metal sulfides such as sodium sulfide and potassium sulfide; alkaline earth-metal sulfides such as magnesium sulfide and calcium sulfide; and quaternary ammonium hydroxide such as tetramethylammonium hydroxide and tetrabutylammonium hydroxide. Among these, the basic compound is preferably alkali metal hydroxide or alkaline earth metals hydroxide, and more preferably alkali metal hydroxide, further preferably sodium hydroxide or potassium hydroxide from the viewpoint of increasing the recovery factor of the lignin decomposition product of the present invention; and preferably sodium hydroxide from the viewpoint of increasing the recovery factor of the lignin decomposition product of the present invention and workability such as handleability at room temperature and atmospheric pressure.

The amount of the basic compound in step 1 is preferably 70 parts by mass or less, more preferably 60 parts by mass or less, further preferably 55 parts by mass or less, further preferably 50 parts by mas or less, further preferably 40 parts by mas or less, further preferably 30 parts by mas or less, and further preferably 20 parts by mas or less, and preferably 8 parts by mass or more, and more preferably 10 parts by mass or more relative to 100 part by mass of the solid content of the plant biomass from the viewpoint of improving the recovery factor of the lignin decomposition product of the present invention.

The amount of water in step 1 is preferably 10 parts by mass or more, more preferably 150 parts by mass or more, further preferably 250 parts by mass or more, further preferably 350 parts by mass or more, further preferably 450 parts by mass or more, further preferably 550 parts by mass or more, further preferably 650 parts by mass or more, and further preferably 750 parts by mass or more, and preferably 8,000 parts by mass or less, more preferably 5,000 parts by mass or less, further preferably 3,500 parts by mass or less, further preferably 2,500 parts by mass or less, and further preferably 1,500 parts by mass or less relative to 100 parts by mass of the solid content of the plant biomass from the viewpoint of improving the recovery factor of the lignin decomposition product of the present invention, workability such as homogeneous stirring and mixing, and economic efficiency such as excessive equipment and heating cost.

The H-factor (hereinafter also called HF) is preferably 0.01 or more, more preferably 0.1 or more, further preferably 1 or more, further preferably 2 or more, and further preferably 3 or more, and 25,000 or less, preferably 10,000 or less, more preferably 5,000 or less, further preferably 3,000 or less, further preferably 1,500 or less, further preferably 1,200 or less, further preferably 1,000 or less, further preferably 400 or less, further preferably 300 or less, further preferably 100 or less, further preferably 50 or less, further preferably 30 or less from the viewpoint of increasing the recovery factor of the lignin decomposition product of the present invention and economic efficiency in the treatment in step 1.

The HF has been used conventionally as a control index in the digestion step of pulp, and is one variable as which the effects of temperature and time is defined.

When the temperature is high, the reaction of the treatment of step 1 is promoted. The treatment of step 1 also relates to time at the same time. Therefore, the relative velocity at another temperature is calculated by the expression of Arrhenius by setting the delignification reaction velocity at 100° C. as 1. Calculation is performed by the HF, which is a product with the time at the temperature.

In the present invention, the HF is an index indicating the total amount of heat given to the reaction system in the treatment of the biomass using alkali, and is expressed by the following Expression (1). The HF is calculated by integrating with respect to the time t for which alkaline liquid is in contact with the biomass.

[Expression 1]

$$HF = \int_0^t \exp(43.2 - 16115/T) dt \quad (1)$$

where t is the time (h), T is the absolute temperature (K), and the integration range is 0 to t.

For example, to satisfy that the HF is 3 or more, when heat treatment is performed at 70° C., around 150 hours of the treatment time is necessary. When heat treatment is performed at 85° C., around 20 hours of the treatment time is necessary. When heat treatment is performed at 100° C., around 4.5 hours of the treatment time is necessary.

The temperature and the time of the treatment of step 1 is preferably set from the viewpoint of the recovery factor of the lignin decomposition product of the present invention, the shortening of the cycle time, and economic efficiency.

Therefore, the temperature of the treatment of step 1 is, for example, 10° C. or more and preferably 20° C. or more; preferably 70° C. or more, more preferably 80° C. or more, further preferably 90° C. or more, and further preferably 95° C. or more from the viewpoint of increasing the recovery factor of the lignin decomposition product of the present invention and the shortening of cycle time; and preferably 180° C. or less, more preferably 150° C. or less, further preferably 140° C. or less, further preferably 130° C. or less, and further preferably 120° C. or less from the viewpoint of the recovery factor of the lignin decomposition product of the present invention and economic efficiency.

The time of the treatment of step 1 indicates the time for which the temperature is maintained in the above-mentioned temperature range of treatment, and is the time for which the temperature is maintained in the temperature range of, for example, 10° C. or more and 180° C. or less, and preferably 70° C. or more and 150° C. or less, more preferably 80° C. or more and 140° C. or less, further preferably 90° C. or more and 130° C. or less, and further preferably 95° C. or more and 120° C. or less.

Since the time of the treatment of step 1 varies depending on the differences of the scale of treatment equipment and the speed of a temperature rise and a temperature drop, it cannot be sweepingly stated. However, the time of the treatment of step 1 is preferably 0.1 hour or more, more preferably 0.5 hours or more, further preferably 1 hours or more, and further preferably 1.5 hours or more from the viewpoint of increasing the recovery factor of the lignin decomposition product of the present invention, and, for example, 1 month or less, and preferably 1 week or less without limiting the upper limit particularly, and preferably 50 hours or less, more preferably 28 hours or less, further preferably 20 hours or less, further preferably 15 hours or less, further preferably 10 hours or less, and further preferably 8 hours or less from the viewpoint of the recovery factor of the lignin decomposition product of the present invention, shortening of cycle time, and economic efficiency.

The lignin decomposition product of the present invention usually exists in the aqueous phase portion of the reaction product obtained by the treatment of step 1. Therefore, this aqueous phase can be separated, and the lignin decomposition product of the present invention can be extracted therefrom in step 2.

The aqueous phase can be extracted, for example, by separating the liquid portion of the alkali-treated biomass of step 1.

The aqueous phase can be extracted by washing the lignin decomposition product existing in the separated solid portion (in the solid phase) of the alkali-treated biomass with water, dissolving in water, followed by extraction in addition the above-mentioned separation.

Specifically, the lignin decomposition product of the present invention can be obtained by a step of mixing a solvent, preferably a solvent containing at least one selected from alcohols having 1 or more and 3 or less carbon atoms in the aqueous phase collected from the reaction liquid of step 1 and the aqueous phase collected from the solid portion of the alkali-treated biomass of step 1 to deposit impurities in the mixture, a step of removing the deposited impurities, a step of removing organic solvent from the above-mentioned mixture, and a step of depositing the lignin decomposition product, for example, by adding acid. Additionally, acid or a basic compound may be removed from the obtained lignin decomposition product by a dialysis membrane or the like.

The thus obtained lignin decomposition product may be dispersed together with water or other solvents, and may be dried into a solid by evaporating solvent.

In the present invention, the following step 3 can also be performed after step 2. The degree of modification and the molecular weight of lignin can be further adjusted by step 3.
Step 3: a step of heating the lignin decomposition product obtained in step 2

Step 3 is preferably performed in the absence of solvent.

The heating temperature in step 3 is preferably 60° C. or more, and more preferably 100° C. or more, and preferably 170° C. or less, and more preferably 140° C. or less.

The heating time in step 3 is preferably 1 minute or more, and more preferably 3 minutes or more, and preferably 30 minutes or less, and more preferably 10 minutes or less.

In the present invention, the molecular weight of the obtained lignin decomposition product can also be adjusted by fraction if needed.

<Aspects of the Present Invention and the Like>

The present invention relates to use, as a soil improvement agent, of a lignin decomposition product having an aldehyde yield by alkaline nitrobenzene oxidation of 5% by mass or more, a weight average molecular weight of 300 or more and 100,000 or less, and a contact angle with water of 15° or more.

The present invention relates to use, as a soil improvement agent composition, of a composition containing a lignin decomposition product having an aldehyde yield by alkaline nitrobenzene oxidation of 5% by mass or more, a weight average molecular weight of 300 or more and 100,000 or less, and a contact angle with water of 15° or more.

The present invention relates to a lignin decomposition product where the lignin decomposition product is used as a soil improvement agent, the aldehyde yield by alkaline nitrobenzene oxidation is 5% by mass or more, the weight average molecular weight is 300 or more and 100,000 or less, and the contact angle with water is 15° or more.

The present invention relates to a composition containing a lignin decomposition product, where the lignin decomposition product is used as a soil improvement agent composition, the aldehyde yield by alkaline nitrobenzene. oxidation is 5% by mass or more, the weight average molecular weight is 300 or more and 100,000 or less, and the contact angle with water is 15° or more.

The lignin decomposition product used in these are a lignin decomposition product of the present invention, and preferable aspects thereof are the same as the soil improvement agent or the soil improvement agent composition of the present invention.

Aspects of the present invention will be illustrated hereinafter. Items described in the soil improvement agent, the soil improvement agent composition, and the method for improving soil of the present invention can be applied to these aspects properly. The items described in the aspects can be properly applied to one another.

<1>

A soil improvement agent, containing, as an effective component, a lignin decomposition product having an aldehyde yield by alkaline nitrobenzene oxidation of 5% by mass or more, a weight average molecular weight of 300 or more and 100,000 or less, and a contact angle with water of 15° or more.

<2>

The soil improvement agent according to <1>, wherein the weight average molecular weight of the lignin decomposition product is 300 or more, preferably 1,000 or more, more preferably 3,000 or more, further preferably 4,500 or more, and furthermore preferably 5,000 or more, and 100,000 or less, preferably 50,000 or less, more preferably 30,000 or less, further preferably 26,000 or less, and furthermore preferably 20,000 or less.

<3>

The soil improvement agent according to <1> or <2>, wherein the contact angle with water of the lignin decomposition product is 15° or more, preferably 17.5° or more, more preferably 20° or more, and further preferably 26° or more, and preferably 100° or more, more preferably 80° or less, further preferably 60° or less, and furthermore preferably 40° or less.

<4>

The soil improvement agent according to any of <1> to <3>, wherein the aldehyde yield by alkaline nitrobenzene oxidation of the lignin decomposition. product is 5% by mass or more, preferably 9% by mass or more, more preferably 10% by mass or more, and further preferably 15% by mass or more, and preferably 50% by mass or less, more preferably 40% by mass or less, further preferably 30% by mass or less, and furthermore preferably 26% by mass or less,

<5>

A soil anticaking agent, a soil-aggregating agent, a soil softener, a soil treatment agent, a soil hardness regulator, or a soil crust formation inhibitor containing a soil improvement agent according to any of <1> to <4>.

<6>

A soil improvement agent composition containing a lignin decomposition product having an aldehyde yield by alkaline nitrobenzene oxidation of 5% by mass or more, a weight average molecular weight of 300 or more and 100,000 or less, and a contact angle with water of 15° or more.

<7>

The soil improvement agent composition according to <6>, wherein the weight average molecular weight of the lignin decomposition product is 300 or more, preferably 1,000 or more, more preferably 3,000 or more, further preferably 4,500 or more, and furthermore preferably 5,000 or more, and 100,000 or less, preferably 50,000 or less, more preferably 30,000 or less, further preferably 26,000 or less, and furthermore preferably 20,000 or less.

<8>

The soil improvement agent composition according to <6> or <7>, wherein the contact angle with water of the lignin decomposition product is 15° or more, preferably 17.5° or more, more preferably 20° or more, and further preferably 26° or more, and preferably 100° or more, more preferably 80° or less, further preferably 60° or less, and furthermore preferably 40° or less.

<9>

The soil improvement agent composition according to any of <6> to <8>, wherein the aldehyde yield by alkaline nitrobenzene oxidation of the lignin decomposition product is 5% by mass or more, preferably 9% by mass or more, more preferably 10% by mass or more, and further preferably 15% by mass or more, and preferably 50% by mass or less, more preferably 40% by mass or less, further preferably 30% by mass or less, and furthermore preferably 26% by mass or less.

<10>

The soil improvement agent composition according to any of <6> to <9>, containing the lignin decomposition product in an amount of preferably 25% by mass or more, more preferably 40% by mass or more, and further preferably 60% by mass or more, and preferably 100% by mass or less, more preferably 90% by mass or less, and further preferably 80% by mass or less.

<11>

The soil improvement agent composition according to any of <6>to <10> containing one or more of the following (1) to (6):
(1) a fertilizer component;
(2) a mineral powder, a clay component, or a soil-improving component other than lignin, preferably a mineral powder, a clay component, or a soil-improving component, selected from zeolite, vermiculite, bentonite, soft silica (silicate terra alba), perlite, peat moss, and bark compost;
(3) a polymer substance, preferably a polymer substance selected from polyethyleneimine, polyvinyl alcohol, and polyacrylic acid;
(4) a signal molecule, preferably a signal molecule selected from chitooligosaceharide, a chitinous compound, and a flavonoid, such as isoflavone and rutin;
(5) a fungus, preferably a fungus selected from an arbuscular mycorrhizal fungus; and
(6) a bacterium, preferably a bacterium selected from *Bacillus* sp., *Pseudomonas* sp., *Azospirillum* sp., *Paenibacillus* sp., *Burkholderia* sp., *Serratia* sp., *Enterobacter* sp., *Brevibacterium* sp., *Curtobacterium* sp., and a legume symbiotic root nodule bacterium.

<12>

The soil improvement agent composition according to any of <6> to <11>, containing at least either of the f0ll0wing (5) and (6):
(5) a fungus, preferably a fungus selected from an arbuscular mycorrhizal fungus; and
(6) a bacterium, preferably a bacterium selected from *Bacillus* sp., *Pseudomonas* sp., *Azospirillum*. sp., *Paenibacillus* sp., *Burkholderia* sp., *Serratia* sp., *Enterobacter* sp., *Brevibacterium* sp., *Curtobacterium* sp., and a legume symbiotic root nodule bacterium.

<13>

The soil improvement agent composition according to <12>, containing $10^2$ cfu (colony forming unit) or more and $10^7$ cfu or less of (5) a fungus and/or (6) a bacterium per 1 g of the lignin decomposition product, respectively.

<14>

A soil anticaking agent composition, a soil-aggregating agent composition, a soil softener composition, a soil treatment agent composition, a soil hardness regulator composition, or a soil crust formation inhibitor composition, containing the soil improvement agent composition according to any of <6>to <13>.

<15>

A method for improving soil, including supplying, to soil, a lignin decomposition product having an aldehyde yield by alkaline nitrobenzene oxidation of 5% by mass or more, a weight average molecular weight of 300 or more and 100,000 or less, and a contact angle with water of 15° or more.

<16>

The method for improving soil according to <15>, wherein the weight average molecular weight of the lignin decomposition product is 300 or more, preferably 1,000 or more, more preferably 3,000 or more, further preferably 4,500 or more, and furthermore preferably 5,000 or more, and 100,000 or less, preferably 50,000 or less, more preferably 30,000 or less, further preferably 26,000 or less, and furthermore preferably 20,000 or less.

<17>

The method for improving soil according to <15> or <16>, wherein the contact angle with water of the lignin decomposition product is 15° or more, preferably 17.5° or more, more preferably 20° or more, and further preferably 26° or more, and preferably 100° or more, more preferably 80° or less, further preferably 60° or less, and furthermore preferably 40° or less.

<18>

The method for improving soil according to any of <15> to <17>, wherein the aldehyde yield by alkaline nitrobenzene oxidation of the lignin decomposition product is 5% by mass or more, preferably 9% by mass or more, more preferably 10©% by mass or more, and further preferably 15% by mass or more, and preferably 50% by mass or less, more preferably 40% by mass or less, further preferably 30% by mass or less, and furthermore preferably 26% by mass or less.

<19>

The method for improving soil according to any of <15> to <18>, wherein the lignin decomposition product is supplied in an amount of preferably 0.0001 parts by mass or more, more preferably 0.01 parts by mass or more, and further preferably 0.05 parts by mass or more, and preferably 10 parts by mass or less, more preferably 5 parts by mass or less, and further preferably 2.5 parts by mass or less per 100 parts by mass of soil.

<20>

The method for improving soil according to any of <15>to <19>, wherein the lignin decomposition product is sprayed in an amount of preferably 0.2 kg or more, more preferably 2 kg or more, and further preferably 20 kg or more, and preferably 20000 kg, more preferably 5000 kg or less, and further preferably 2000 kg or less per 10 ares of soil.

<1>

A method for producing a soil improvement agent, having the following step 1 and step 2, Step 1: mixing plant biomass, 8 parts by mass or more and 70 parts by mass or less of a basic compound relative to 100 parts by mass of the solid content of the plant biomass, and 10 parts by mass or more and 10,000 parts by mass or less of water relative to 100 parts by mass of the solid content of the plant biomass; and treating the mixture under the condition that the 11-factor is 25,000 or less to obtain a reaction product, and Step 2: extracting, from the reaction product obtained in step 1, a lignin decomposition product, wherein the aldehyde yield by alkaline nitrobenzene oxidation is 5% by mass or more, the weight average molecular weight is 300 or more and 100,000 or less, and the contact angle with water is 15° or more.

<22>

The method for producing a soil improvement agent according to <21>, wherein the plant biomass in step 1 is herbaceous biomass.

<23>

The method for producing a soil improvement agent according to <21> or <22>, wherein the following step 3 is performed after step 2, Step 3: heating the lignin decomposition product obtained in step 2.

<24>

The method for producing a soil improvement agent according to <23>, wherein the lignin decomposition product is heated in the absence of solvent in step 3.

<25>

Use, as a soil improvement agent, of a lignin decomposition product having an aldehyde yield by alkaline nitrobenzene oxidation of 5% by mass or more, a weight average molecular weight of 300 or more and 1.00,000 or less, and a contact angle with water of 15° or more.

<26>

Use, as a soil improvement agent composition, of a composition containing a lignin decomposition product having an aldehyde yield by alkaline nitrobenzene oxidation of 5% by mass or more, a weight average molecular weight of 300 or more and 100,000 or less, and a contact angle with water of 15° or more.

<27>

A lignin decomposition product as a soil improvement agent, having an aldehyde yield by alkaline nitrobenzene oxidation of 5% by mass or more, a weight average molecular weight of 300 or more and 100,000 or less, and a contact angle with water of 15° or more.

<28>

A composition containing a lignin decomposition product used as a soil improvement agent composition, wherein the lignin decomposition product has an aldehyde yield by alkaline nitrobenzene oxidation of 5% by mass or more, a weight average molecular weight of 300 or more and 100,000 or less, and a contact angle with water of 15° or more.

<29>

Use of a lignin decomposition product having an aldehyde yield by alkaline nitrobenzene oxidation of 5% by mass or more, a weight average molecular weight of 300 or more and 100,000 or less, and a contact angle with water is 15° or more for producing an agricultural article having an effect of improving soil.

EXAMPLES

Production Example 1

Lignin decomposition product 1 used as a soil improvement agent was manufactured by the following steps 1 and 2.

(Step 1)

A glass bottle was charged with 30 g by dry mass of sugarcane bagasse as herbaceous biomass, and an aqueous 1.6% by mass sodium hydroxide solution was added thereto so that the solid content was 10% by mass. The glass bottle was heated at 95° C. for 6 hours in an autoclave to obtain a reaction product. The HF in step 1 was 3.5.

(Step 2)

The reaction product obtained at step I was vacuum-filtered through a 400-mesh SUS mesh using a nutsche. The residue was washed with 300 mL of ion exchange water at 90° C. The filtrate and the washing liquid were collected, followed by the addition of 2.4 L of methanol (produced by Wako Pure Chemical Corporation, guaranteed reagent). The deposit was vacuum-filtered (manufactured by Toyo Roshi Kaisha, Ltd., filter paper No. 2), followed by the removal of methanol from the filtrate by vacuum distillation. The pH was adjusted to 4 with 1.0 M hydrochloric acid to obtain a suspension containing a lignin decomposition product.

The suspension obtained in step 2 was centrifuged.

Centrifugal separation was performed under the conditions of 10000 rpm and 20 minutes using a "himac CR 20G III" manufactured by Hitachi Koki Co., Ltd.

After centrifugal separation, supernatant was removed, followed by the addition of 300 mL of ion exchange water and stirring. The mixture was then centrifuged again under the same condition as the above, followed by water washing. Water washing was performed twice, followed by the lyophilization of the obtained precipitate to obtain powdery lignin decomposition product 1. The effective component content in lignin decomposition product 1 was 78% by mass.

The effective component was calculated by the Klason lignin method. That is, the total lignin content was calculated by adding the rate of acid-insoluble lignin and the rate of acid-soluble lignin according to the TAPP1 formal analysis method T222om-83.

The aldehyde yield by alkaline nitrobenzene oxidation of lignin decomposition product 1 was 22.5% by mass, the weight average molecular weight thereof was 9,065, and the water contact angle thereof was 29.9°. The aldehyde yield and the water contact angle were measured by the following methods. The weight average molecular weight was measured by the above-mentioned method.

[Method for Measuring Aldehyde Yield of Lignin Decomposition Product]

A 20 ml vial was charged with 50 mg of a lignin decomposition product, which was a measuring object, 7 ml of an aqueous 2 M sodium hydroxide solution, and 0.4 ml of nitrobenzene. The mixture was heated at 170° C. for 2.5 hours with stirring at 900 rpm. The mixture was cooled after heating and extracted with 10 ml of diethyl ether 3 times, followed by the removal of the reduced product of nitrobenzene and excessive nitrobenzene. Concentrated hydrochloric acid was added to the remaining water layer side, followed by the adjustment of the pH to 1 and the extraction with 10 ml of diethyl ether 3 times. This diethyl ether extract was vacuum-distilled to obtain an oxidized mixture. The volume of this oxidized mixture was increased with 20 mL dichloromethane. Then, 2 ml of the mixture was filtered through a millipore HVHP membrane (manufactured by Nihon Millipore K. K., 0.45 μm in pore size) and subjected to gas chromatography (GC).

A GC device (manufactured by Agilent Technologies Japan, Ltd.) equipped with an Agilent J&W GC column DB-5 (manufactured by Agilent Technologies Japan, Ltd.) was used for gas chromatography. Conditions of gas chromatography were that the amount of a sample was set to 1.0 μL, the helium flow rate was 10 nil/min, the temperature of an injection port was 200° C., and the split ratio was 10:1. The temperature conditions were that the temperature was maintained at 60° C. for 1 minute, then raised at 5° C./min from 60 to 250° C. and maintained at 250° C. for 10 minutes. With regard to quantification, calibration curves of peak area versus content were created using three aldehydes, which were vanillin, syringa aldehyde and para-hydroxybenzaldehyde, as reagents, respectively. The yields of the above-mentioned three aldehydes in the lignin decomposition product were determined separately. The aldehyde yield (%) was calculated by the following expression.

Aldehyde yield (%)=(aldehyde mass yield obtained by totaling amounts of three aldehyde/mass of lignin decomposition product)×100

<Method for Measuring Water Contact Angle of Lignin Decomposition Product>

A shelf-supporting fitting (manufactured by Wakisangyo Co., Ltd, part number DB-003) was placed in a cylindrical spacer (manufactured by Yahata Neji Corporation: Yahata Neji spacer, 10.2 mm in inner diameter×30 mm in length) so that the thicker side (head face) thereof was in the spacer. Next, around 0.1 to 0.3 g of a powdery lignin decomposition product shown in Table 1 was added in the spacer. Another shelf-supporting fitting (manufactured by Wakisangyo Co., Ltd, part number DB-003) was placed in the spacer so that the thicker side (head face) thereof was in contact with the lignin decomposition product. That is, the shelf-supporting fittings were placed so that the lignin decomposition product was between the two thicker sides (head faces) of the shelf-supporting fittings.

Next, the both ends of the above-mentioned shelf-supporting fittings were clamped in a revolving bench vice (manufactured by TRUSCO NAKAYAMA CORPORATION, part number BV-65SN). Pressure was applied to the upper and lower shell-supporting fittings until the lignin decomposition product became particulate. The lignin decomposition product was pressurized into a particulate substance having a flat top surface and a flat bottom surface by this operation so that the density was around 1.5 g/cm$^3$.

The obtained particulate substance of the lignin decomposition product was placed on a flat basis, pure water at 20° C. was dropped onto the surface (top surface) of the particulate substance at a particle size of 5 μm, and the contact angle 1 second after was measured. A contact angle was determined by determining angles formed by the two lines connecting the apex with the right and left endpoints, respectively and the surface of the solid and doubling one of these angles (θ/2 method). Every sample is measured 3 times, and a value obtained as the average thereof was adopted as a water contact angle.

Production Example 2

Powdery lignin decomposed material 2 that was used as a soil improvement agent was produced in the same way as in Production Example 1, but the autoclave conditions were set to 120° C. and 2 hours in step 1. The HF in step 1 was 20.3. When the effective component content in lignin decomposition product 2 was measured in the same way as in Production Example 1, the effective component content was 81% by mass.

The aldehyde yield by alkaline nitrobenzene oxidation of lignin decomposition product 2 was 20.3% by mass, the weight average molecular weight thereof was 9,704, and the water contact angle thereof was 32.8°. These physical property values were measured in the same way as lignin decomposition product 1.

Examples 1 to 3 and Comparative Examples 1 to 4

<Evaluation>
(1) Measurement of Soil Hardness

The paddy field soil obtained by passing paddy field soil (alluvial soil) (water content: 30%) of Saga Prefecture collected as soil through a sieve having an aperture size of 2 mm and removing coarse particles, stones and gravel was used.

The soil was fed to a 22.4 L polyethylene bag made of plastic (unipack SL-4: manufactured by SEISANNIPPON-SFIA LTD.). A soil improvement agent shown in Table 1 was further added in a predetermined amount shown in Table 1, followed by stirring the mixture in the bag far 10 seconds and mixing. The obtained mixture was used as a soil sample.

Then, 700 g of the soil sample was fed to a 1 L disposable cup that was made of polypropylene and had 13 holes having a diameter of around 2 mm at the bottom surface (manufactured by AS ONE Corporation).

Next, 475 ml of water was fed to the above-mentioned cup from above the soil sample, followed by feeding 475 ml of water thereto again 48 hours thereafter.

The hardness of the soil sample four days after (96 hours after) the final feeding of water was measured. The measurement of the hardness of the soil sample was performed using a Yamanaka soil hardness meter (FUJIWARA SCIENTIFIC CO., LTD., standard soil hardness meter No. 351).

The tip cone of the soil hardness scale was inserted until the collar and the surface of the soil sample was in contact, and the tip cone was drawn out slowly according to the operation manual of the above-mentioned soil hardness meter. The index (mm) of the scale at the time was read and calculated based on the form of the supporting force strength (kg/cm$^2$) by the following expression. The supporting force strength was shown in Table 1 as soil hardness.

$$P = [100X]/[0.7952(40-X)^2]$$

P: Supporting force strength (kg/cm$^2$)
X: Index (mm)

(2) Measurement of Germination Rate

First; 900 g of a soil sample of the above-mentioned (1) was fed to a 1 L disposable cup that was made of polypropylene and had 13 holes having a diameter of around 2 mm at the bottom surface (manufactured by AS ONE Corporation). Soybeans (species Fukuyutaka, IWAKURA SEED co.) were sown one by one in the soil at a position 3 cm deep from the surface layer of the soil. Seven grains were sown in total. The soybeans were covered with the soil in the cup. Then, 475 ml of water was fed into the cups after sowing treatment, and 475 ml of water was fed again 48 hours thereafter. Next, 475 ml of water was fed again further 48 hours thereafter. Soybeans with cotyledons completely out of the soil were considered to be germinated 7 days after (576 hours after) sowing, and the germination rate was calculated. Results are shown in Table 1.

residual lignin is obtained by decomposing, by an enzyme, cellulose in bagasse subjected to low alkali treatment and removing sugar liquid therefrom.

Comparative Production Example 1

(Step 1)

An Erlenmeyer flask (1 L) was charged with 50 g by dry mass of sugarcane bagasse as a lignocellulose material. Ion exchange water and an acetic acid buffer were added so that solid content was 10% by mass. To the liquid was added CellicCTec2 (produced by Novozymes corp., trade name) so that the amount was 50 mg/g—substrate. The mixture was stirred in a bioshaker (manufactured by TAITEC CORPORATION) at 50° C. and 150 rpm for 72 hours to obtain a reaction product. (Step 2)

The reaction product obtained in step 1 was vacuum-filtered through a 400-mesh SUS mesh using a nutsche. The residue was washed with 500 mL of ion exchange water, and filtration residue (1) and filtration suspension (2) were obtained.

Filtration suspension (2) obtained in step 2 was centrifuged.

The centrifugal separation was performed under the conditions of 8000 rpm and 30 minutes using the "himac CR 20G III" manufactured by Hitachi Koki Co., Ltd.

After centrifugal separation, supernatant was removed, followed by the addition of 300 ml, of ion exchange water and stirring. The mixture was then centrifuged again under

TABLE 1

| | | Soil improvement agent | | | Amount of soil improvement | | |
| --- | --- | --- | --- | --- | --- | --- | --- |
| | | Type | Aldehyde yield (% by mass) | Weight average molecular weight | Contact angle (°) | agent added (part by mass) | Soil hardness (kg/cm$^2$) | Germination rate (%) |
| Comparative | 1 | — | — | — | — | — | 6.2 | 29 |
| Example | 2 | Ca lignin sulfonate | 10.0 | 3,088 | 5.5 | 1.0 | 6.3 | 14 |
| | 3 | Comparative lignin decomposition product 1 (saccharification residual lignin) | 15.0 | Unmeasurable | 8.5 | 1.0 | 12.3 | 29 |
| | 4 | Comparative lignin decomposition product 2 (peat-derived lignin) | 1.6 | 12,911 | 37.9 | 1.0 | 6.3 | 14 |
| Example | 1 | Lignin decomposition product 1 | 22.5 | 9,065 | 29.9 | 1.0 | 1.5 | 86 |
| | 2 | Lignin decomposition product 1 | 22.5 | 9,065 | 29.9 | 0.3 | 0.9 | 71 |
| | 3 | Lignin decomposition product 2 | 20.3 | 9,704 | 32.8 | 0.3 | 1.4 | 86 |

In the Table, the amounts of soil improvement agents added are based on part by mass relative to 100 parts by mass of soil (hereinafter in the same way).

In the Table, soil improvement agents used in Comparative Examples are the following.

Ca lignin sulfonate: Lignosuper D, produced by KONG NEW MATERIAL. DEVELOPMENT Co., Ltd., the main component is Ca lignin sulfonate.

Comparative lignin decomposition product 1: saccharification residual lignin obtained in the following Comparative Production Example 1. The saccharification the same condition as the above, followed by water washing. Water washing was performed twice, followed by mixing obtained precipitate (3) and filtration residue (1) obtained in step 2, and lyophilization to obtain saccharification residual lignin, which was comparative lignin decomposition product 1. Results obtained by measuring the aldehyde yield and the contact. angle. of the saccharification residual lignin in the same way as lignin decomposition product 1 were shown in Table 1. This saccharification residual lignin had too large molecular weight to measure the weight average molecular weight.

Comparative lignin decomposition product 2: peat-derived lignin obtained by the following Comparative Production Example 2

Comparative Production Example 2

(Step 1)

A glass bottle was charged with 30 g by dry mass of peat moss (produced from the HOKKAIDO RYOKUKOU CO., LTD.) as peat materials. Then, 0.5% by mass of an aqueous sodium hydroxide solution was added thereto so that the solid content was 10% by mass. The glass bottle was heated at 50° C. for 2 hours in a thermostat oven to obtain a reaction product.

(Step 2)

The reaction product obtained in step 1 was vacuum-filtered through a 400-mesh SUS mesh using a nutsche. The residue was washed with 300 mL of ion exchange water, and the pH was adjusted to 3 by adding 1.0 M hydrochloric acid to the obtained filtrate to obtain suspension (1).

(Step 3)

Filtration suspension (1) obtained in step 2 was centrifuged.

Centrifugal separation was performed under the conditions of 8000 rpm and 30 minutes using the "himac CR 20G III" manufactured by Hitachi Koki Co., Ltd.

After centrifugal separation, supernatant was removed, followed by the addition of 300 mL of ion exchange water and stirring. The mixture was then centrifuged again under the same condition as the above, followed by water washing. Water washing was performed twice, followed by the lyophilization of the obtained precipitate to obtain peat-derived lignin, which was comparative lignin decomposition product 2. Results obtained by measuring the aldehyde yield, the contact angle and the weight average molecular weight of this peat-derived lignin in the same way as lignin decomposition product 1 were shown in Table 1.

Production Example 3

Powdery lignin decomposition product 3 used as a soil improvement agent was produced in the same way as Production Example 1. However, the autoclave conditions in step 1 were 120° C. and 1 hour, and the concentration of an aqueous sodium hydroxide solution at the time of treatment was 5.0% by mass. The HF in step 1 was 12.8. When the effective component content in lignin decomposition product 3 was measured in the same way as Production Example 1, the effective component content was 54% by mass.

The aldehyde yield by alkaline nitrobenzene oxidation of lignin decomposition product 3 was 12.9% by mass, the weight average molecular weight thereof was 8,125, and the water contact angle thereof was 36.9°. These physical property values were measured in the same way as lignin decomposition product 1.

Production Example 4

Powdery lignin decomposition product 4 used as a soil improvement agent was produced in the same way as Production Example 1. However, the autoclave conditions in step 1 were 135° C. and 7 hours. The HF in step 1 was 64.4. When the effective component content in lignin decomposition product 4 was measured in the same way as Production Example 1, the effective component content was 66% by mass.

The aldehyde yield by alkaline nitrobenzene oxidation of lignin decomposition product 4 was 9.0% by mass, the weight average molecular weight thereof was 5,121, and the water contact angle thereof was 36.0°. These physical property values were measured in the same way as lignin decomposition product Production Example 5

Powdery lignin decomposition product 5 used as a soil improvement agent was produced in the same way as Production Example 1. However, the autoclave conditions in step 1 were 135° C. and 7 hours, and the concentration of an aqueous sodium hydroxide solution at the time of treatment was 2.5% by mass. The HF in step 1 was 64.4. When the effective component content in lignin decomposition product 5 was measured in the same way as Production Example 1, the effective component content was 82% by mass.

The aldehyde yield by alkaline nitrobenzene oxidation of lignin decomposition product 5 was 9.3% by mass, the weight average molecular weight thereof was 5,432, and the water contact angle thereof was 30.4°. These physical property values were measured in the same way as lignin decomposition product 1.

Production Example 6

Powdery lignin decomposition product 6 used as a soil improvement agent was produced in the same way as Production Example 1. However, the autoclave conditions in step 1 were 135° C. and 7 hours, and the concentration of an aqueous sodium hydroxide solution at the time of treatment was 5.0% by mass. The HF in step 1 was 64.4. When the effective component content in lignin decomposition product 6 was measured in the same way as Production Example 1, the effective component content was 53% by mass.

The aldehyde yield by alkaline nitrobenzene oxidation of lignin decomposition product 6 was 13.4% by mass, the weight average molecular weight thereof was 4,559, and the water contact angle thereof was 35.8°. These physical property values were measured in the same way as lignin decomposition product 1.

Production Example 7

Powdery lignin decomposition product 7 used as a soil improvement agent was produced in the same way as Production Example 1. However, the autoclave conditions in step 1 were 25° C. and 2 hours. The HF in step 1 was 0.0. When the effective component content in lignin decomposition product 7 was measured in the same way as Production Example 1, the effective component content was 41.7% by mass.

The aldehyde yield by alkaline nitrobenzene oxidation of lignin decomposition product 7 was 26.0% by mass, the weight average molecular weight thereof was 9,994, and the water contact angle thereof was 39.7°. These physical property values were measured in the same way as lignin decomposition product 1.

Production Example 8

Powdery lignin decomposition product 8 used as a soil improvement agent was produced by subjecting lignin decomposition product 1 obtained in Production Example 1 to the treatment of the following step 3.

(Step 3)

Heat treatment was performed at 100° C. and for 5 minutes in the absence of solvent using a halogen moisture meter HG6.3 (manufactured by METTLER TOLEDO K.K.). Heat treatment time was defined as time after the temperature reached 100° C., temperature increase was defined as time until the temperature in the equipment reached 100° C., and temperature decrease was performed without any treatment by rapidly exposing lignin decomposition product 1 to room temperature after heat treatment.

When the effective component content in lignin decomposition product 8 was measured in the same way as Production Example 1, the effective component content was 59.4% by mass.

The aldehyde yield by alkaline nitrobenzene oxidation of lignin decomposition product 8 was 21.3% by mass, the weight average molecular weight thereof was 16,148, and the water contact angle thereof was 28.9°. These physical property values were measured in the same way as lignin decomposition product 1.

Production Example 9

Powdery lignin decomposition product 9 used as a soil improvement agent was produced in the same way as Production Example 8. However, conditions of heat treatment in step 3 were 120° C. and 5 minutes. When the effective component content in lignin decomposition product 9 was measured in the same way as Production Example 1, the effective component content was 66.9% by mass.

The aldehyde yield by alkaline nitrobenzene oxidation of lignin. decomposition product 9 was 15.4% by mass, the weight average molecular weight thereof was 18,289, and the water contact angle thereof was 26.1°. These physical property values were measured in the same way as lignin decomposition product 1.

Production Example 10

Powdery lignin decomposition product 10 used as a soil improvement agent was produced in the same way as Production Example 8. However, conditions of heat treatment in step 3 were 140° C. and 5 minutes. When the effective component content in lignin decomposition product 10 was measured in the same way as Production Example 1, the effective component content was 69.8% by mass.

The aldehyde yield by alkaline nitrobenzene oxidation of lignin decomposition product 10 was 14.4% by mass, the weight average molecular weight thereof was 25,663, and the water contact angle thereof was 30.8°. These physical property values were measured in the same way as lignin decomposition product 1.

Production Example 11

Powdery lignin decomposition product 11 used as a soil improvement agent was produced by subjecting lignin decomposition product 1 obtained in Production Example 1 to the treatment of the following step 4.

(Step 4)

Lignin decomposition product 1 was dispersed in ion exchange water to obtain a 0.2% suspension, which was filtered through a filter paper No. 2 (manufactured by Advantec Toyo Kaisha, Ltd.) to obtain a filtrate. Fraction treatment was performed on the obtained filtrate using a pencil type module (manufactured by Asahi Kasei Corporation, Model: SIP-0013 (UF)).

When the effective component content in lignin decomposition product 11 was measured in the same way as Production Example 1, the effective component content was 78.7% by mass.

The aldehyde yield by alkaline nitrobenzene oxidation of lignin decomposition product 11 was 12.6% by mass, the weight average molecular weight thereof was 14,491, and the water contact angle thereof was 33.1°. These physical property values were measured in the same way as lignin decomposition product 1.

Examples 4 to 12 and Comparative Example 5

The soil hardness was measured in the same way as in Example 1 using the lignin decomposition products obtained above and comparative black liquid lignin. Results are shown in Table 2. As the contact angle becomes lamer and the soil hardness becomes lower, a lignin decomposition product becomes more useful as a soil improvement agent.

TABLE 2

| | | Soil improvement agent | | | | Amount of soil improvement agent added (part by mass) | Soil hardness (kg/cm$^2$) |
|---|---|---|---|---|---|---|---|
| | | Type | Aldehyde yield (% by mass) | Weight average molecular weight | Contact angle (°) | | |
| Comparative Example | 5 | Black liquid lignin | 8.6 | 8,255 | 13.5 | 0.3 | 4.9 |
| Example | 4 | Lignin decomposition product 3 | 12.9 | 8,125 | 36.9 | 0.3 | 1.8 |
| | 5 | Lignin decomposition product 4 | 9.0 | 5,121 | 36 | 0.3 | 3.1 |
| | 6 | Lignin decomposition product 5 | 9.3 | 5,432 | 30.4 | 0.3 | 4.6 |
| | 7 | Lignin decomposition product 6 | 13.4 | 4,559 | 35.8 | 0.3 | 3.1 |
| | 8 | Lignin decomposition product 7 | 26.0 | 9,994 | 39.7 | 0.3 | 2.9 |
| | 9 | Lignin decomposition product 8 | 21.3 | 16,148 | 28.9 | 0.3 | 4.1 |
| | 10 | Lignin decomposition product 9 | 15.4 | 18,289 | 26.1 | 0.3 | 2.1 |
| | 11 | Lignin decomposition product 10 | 14.4 | 25,663 | 30.8 | 0.3 | 2.9 |
| | 12 | Lignin decomposition product 11 | 12.6 | 14,491 | 33.1 | 0.3 | 2.2 |

Examples 13 to 16

Soil improvement agent compositions were produced by homogenously mixing lignin decomposition product 1 obtained in Production Example 1 with components in Table 3.

Soil hardness was measured like Example 1 using the obtained soil improvement agent composition. For the measurement of soil hardness, a soil improvement agent composition shown in Table 3 was added in a predetermined amount shown in Table 3. Results are shown in Table 3. Soil hardness became small and it turned out that all are useful as soil improvement agent compositions.

TABLE 3

| | | | Example | | | |
|---|---|---|---|---|---|---|
| | | | 13 | 14 | 15 | 16 |
| Soil improvement agent composition | Blended component (% by mass) | Lignin decomposition product 1 | 30.0 | 86 | 28 | 86 |
| | | Fertilizer[*1] | 12.5 | 12 | 12.5 | 12 |
| | | Soft silica[*2] | 10.0 | | 10 | |
| | | Perlite[*3] | 27.5 | | 27.5 | |
| | | Commercial soil conditioning material[*4] | 20.0 | | 20 | |
| | | Polyacrylic acid[*5] | | | 2 | |
| | | Rutin[*6] | | | | 2 |
| | | Root nodule bacteria preparation[*7] | | 2 | | |
| | Total | | 100 | 100 | 100 | 100 |
| Amount of soil improvement agent composition added (part by mass) | | | 0.3 | 0.3 | 0.3 | 0.3 |
| Soil hardness (kg/cm$^2$) | | | 0.27 | 1.67 | 1.20 | 0.97 |

The components in the table are as follows.
[*1]Fertilizer: trade name "Mizuho compound fertilizer No. 8 (fertilizer 8-8-4)," SunAgro co., Ltd.
[*2]Soft silica: Softsilica Co., Ltd,
[*3]Perlite: available from Kinkouen K. K.
[*4]Commercial soil conditioning material: trade name "bark ace," Hirakata Stockbreeders' Association
[*5]Polyacrylic acid: weight average molecular weight 1,000,000, manufactured by Wake Pure Chemical, Ltd.
[*6]Rutin: manufactured by Wako Pure Chemical, Ltd.
[*7]Root nodule bacteria preparation: trade name "Mamezo," Tokachi Nokyoren, Federation Chemurgy Research Institute

The invention claimed is:

1. A method for improving soil, comprising supplying, to soil, a lignin decomposition product having an aldehyde yield by alkaline nitrobenzene oxidation of 5% by mass or more, a weight average molecular weight of 300 or more and 100,000 or less, and a contact angle with water of 20° or more and 40° or less, wherein the lignin decomposition product is obtained by a producing method including the following step 1 and step 2:

step 1: mixing plant biomass, 8 parts by mass or more and 70 parts by mass or less of a basic compound relative to 100 parts by mass of a solid content of the plant biomass, and 10 parts by mass or more and 10,000 parts by mass or less of water relative to 100 parts by mass of the solid content of the plant biomass, and treating the mixture under the condition that the H-factor is 25,000 or less to obtain a reaction product; and step 2: extracting, from the reaction product obtained in the step 1, the lignin decomposition product having an aldehyde yield by alkaline nitrobenzene oxidation of 5% by mass or more, a weight average molecular weight of 300 or more and 100,000 or less, and a contact angle with water of 20° or more and 40° or less.

2. The method for improving soil according to claim 1, wherein the aldehyde yield by alkaline nitrobenzene oxidation of the lignin decomposition product is 15% by mass or more.

3. The method for improving soil according to claim 1, wherein the lignin decomposition product is supplied in an amount of 0.0001 parts by mass or more and 10 parts by mass or less per 100 parts by mass of soil.

4. The method for improving soil according to claim 1, wherein the lignin decomposition product is sprayed in an amount of 0.2 kg or more and 20000 kg or less per 10 ares of soil.

* * * * *